(12) United States Patent
Hack et al.

(10) Patent No.: US 12,675,563 B2
(45) Date of Patent: *Jul. 7, 2026

---

(54) METHOD FOR UNLOCKING AN ELECTRONIC DEVICE

(71) Applicant: Vuzix Corporation, West Henrietta, NY (US)

(72) Inventors: Connor Hack, Rochester, NY (US); Gregory Moens, Penfield, NY (US)

(73) Assignee: Vuzix Corporation, West Henrietta, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/811,449

(22) Filed: Aug. 21, 2024

(65) Prior Publication Data

US 2024/0411850 A1 Dec. 12, 2024

Related U.S. Application Data

(63) Continuation of application No. 17/618,413, filed as application No. PCT/US2020/037313 on Jun. 11, 2020, now Pat. No. 12,099,589.

(Continued)

(51) Int. Cl.
*G06F 21/36* (2013.01)
*G02B 27/01* (2006.01)
(Continued)

(52) U.S. Cl.
CPC .......... *G06F 21/36* (2013.01); *G02B 27/017* (2013.01); *G06F 1/163* (2013.01); *G06F 1/1686* (2013.01);
(Continued)

(58) Field of Classification Search
CPC .......... G06F 21/36; G06F 1/63; G06F 1/1686; G06F 3/001; G06F 3/017; G02B 27/17; G02B 2027/0178
(Continued)

(56) References Cited

U.S. PATENT DOCUMENTS 9,430,144 B1 8/2016 Alsvig et al.
10,542,385 B1 * 1/2020 Wagner ................. H04W 4/029
(Continued)

FOREIGN PATENT DOCUMENTS

CN 103941988 A 7/2014
CN 104169857 A 11/2014
(Continued)

OTHER PUBLICATIONS

Kazunori Kenjo et al., "Input Method of Gesture Authentication for Mobile Devices using Touch Panel and Accelerometer," IPSJ SIG Technical Report, Feb. 29, 2012, p. 1-7, vol. 2012-DPS-150 No. 8, Information Processing Society of Japan.

(Continued)

*Primary Examiner* — Michael S McNally
(74) *Attorney, Agent, or Firm* — Harter Secrest & Emery LLP; Jacob D. Merrill, Esq.

(57) ABSTRACT

An electronic device including a processing unit and a gesture input device connected with the processing unit, wherein the gesture input device is operable to detect an input gesture to initiate password entry during a software locked state. The electronic device further includes a display, wherein the processing unit is operable to randomly assign a predefined set of input gestures to a predefined set of password symbols, the display is operable to show an enter password screen showing the randomly assigned set of input gestures corresponding to the set of password symbols, the display is operable to show the randomly assigned pre- (Continued)

defined set of input gestures adjacent to the predefined set of password symbols, and the assigned set of input gestures correspond to the set of password symbols until the password entry is reinitiated.

17 Claims, 13 Drawing Sheets

Related U.S. Application Data

(60) Provisional application No. 62/860,054, filed on Jun. 11, 2019.

(51) Int. Cl.
    *G06F 1/16*        (2006.01)
    *G06F 3/01*        (2006.01)

(52) U.S. Cl.
    CPC .............. *G06F 3/011* (2013.01); *G06F 3/017* (2013.01); *G02B 2027/0178* (2013.01)

(58) Field of Classification Search
    USPC ........................................................... 726/17
    See application file for complete search history.

(56) References Cited

U.S. PATENT DOCUMENTS

| | | |
|---|---|---|
| 2012/0252410 A1 | 10/2012 | Williams |
| 2014/0245433 A1* | 8/2014 | Bao .......................... G06F 21/31 |
| | | 726/19 |
| 2014/0310805 A1 | 10/2014 | Kandekar |
| 2015/0007308 A1* | 1/2015 | Mankowski ............ G06F 21/31 |
| | | 726/19 |
| 2015/0101041 A1 | 4/2015 | Devar et al. |
| 2015/0177864 A1* | 6/2015 | Wong .................... G06F 3/0488 |
| | | 345/174 |
| 2015/0220152 A1 | 8/2015 | Tait et al. |
| 2015/0340040 A1* | 11/2015 | Mun ....................... G10L 17/22 |
| | | 704/246 |
| 2016/0062474 A1 | 3/2016 | Tait et al. |
| 2017/0116408 A1 | 4/2017 | Kapp et al. |
| 2017/0139567 A1 | 5/2017 | Li et al. |
| 2017/0300122 A1 | 10/2017 | Kramer et al. |
| 2018/0075230 A1 | 3/2018 | Yang et al. |

FOREIGN PATENT DOCUMENTS

| | | |
|---|---|---|
| CN | 109753786 A | 5/2019 |
| JP | 01-180060 A | 7/1989 |
| JP | 2016062398 A | 4/2016 |
| JP | 2017045184 A | 3/2017 |
| JP | 2019029804 A | 2/2019 |
| WO | 2009008498 A1 | 1/2009 |
| WO | 2013109926 A1 | 7/2013 |
| WO | 2016025036 A1 | 2/2016 |
| WO | 2016112130 A1 | 7/2016 |
| WO | 2018143313 A1 | 8/2018 |

OTHER PUBLICATIONS

Hutsko et al. (2018) "iPhone Modes: Sleep, Wake, Lock, and Unlocked," dummies consumer electronics article. Retrieved from <https://web.archive.org/web/20180313160144/https://www.dummies.com/consumer-electronics/smartphones/iphone/iphone-modes-sleep-wake-lock-and-unlocked/>.

Ishikawa et al. (2015) "Gingerale: smart Glass of fINger GEsture Authentication Lock Enabler," Dicomo 2015(1): 715-720. English-language translation of excerpt (p. 719).

Lu et al. (Aug. 2018) "FMCode: A 3D In-the-Air Finger Motion Based User Login Framework for Gesture Interface," arXiv:1808.00130v1 [cs.CV]. Retrieved from <https://arxiv.org/pdf/1808.00130.pdf>.

Ntt Docomo, Huawei P20 Pro HW-01K, Instruction Manual, 2018. English-language translation of excerpt (p. 115-145).

\* cited by examiner

METHOD FOR UNLOCKING AN ELECTRONIC DEVICE

CROSS-REFERENCE TO RELATED APPLICATIONS

This patent application is a continuation, and claims the priority benefit of U.S. patent application Ser. No. 17/618, 413, filed Dec. 10, 2021 entitled "Method for Unlocking an Electronic Device", which is a U.S. national phase patent application under 35 U.S.C. § 371 of International Patent Application No. PCT/US2020/037313, filed Jun. 11, 2020, entitled "Method for Unlocking an Electronic Device", which claims the priority benefit of U.S. Provisional Patent Application No. 62/860,054, filed Jun. 11, 2019, entitled "Method for Unlocking an Electronic Device", each of which is incorporated herein by reference in its entirety for all purposes.

TECHNICAL FIELD

The present disclosure relates generally to unlocking a software locked electronic device, and more specifically to unlocking an electronic device operable to identify a gesture sequence on a touch sensitive device and/or camera.

BACKGROUND

With rapid advances in technology, manufacturers of mobile devices (e.g., head mounted displays, smart phones, etc.) are continually challenged to add greater functional capability in smaller form utilizing user interface features to achieve convenience of mobility. For instance, beyond the already advanced data capabilities of mobile devices, a mobile electronic device needs to include functions of software locking and unlocking to provide privacy and data protection.

Head-Mounted Displays (HMDs) are being developed for a range of diverse uses, including military, commercial, industrial, fire-fighting, and entertainment applications. For many of these applications, there is particular value in providing a security feature such as software locking of the HMDs. Because HMDs are becoming increasingly light weight, and not secured to any physical location, they are easily carried away, or may be utilized by unauthorized individuals.

The goals of greater functionality are sometimes at odds with unlocking the electronic device in that a user may require extra actions such as entering a password. Speaking a password while in listening distance of another person or recording device may not provide for reliable security. Typing a password is not an option for electronic devices that do not have a keyboard input device. Similarly, the electronic device may not have available other input means such as a fingerprint or biometric scanner, or a camera with facial recognition capabilities, etc. In such situations, a touchpad or touch screen may be the preferred electronic input device. Therefore, there is a need for a convenient and secure method for unlocking previously software locked electronic devices.

SUMMARY

The present disclosure provides for a software unlock method for unlocking functionality of an electronic device, and the electronic device made therewith.

In a first exemplary embodiment, a method of unlocking software includes providing an electronic device having a processing unit and a gesture input device connected therewith. The method further includes detecting an input gesture operable to initiate password entry, wherein the electronic device is in a software locked state, and randomly assigning a predefined set of input gestures to a predefined set of password symbols. The method of unlocking software additionally includes detecting one of the assigned input gestures via the gesture input device and comparing the entered password symbols, corresponding to the detected input gestures, to a stored unlock password via the processing unit. Further, where the entered password symbols match the stored unlock password, the method enables operation of the electronic device in a software unlocked state.

In a second exemplary embodiment, an electronic device includes a processing unit and a gesture input device connected with the processing unit. The electronic device further includes a projector operable to generate image-bearing light connected with the processing unit, and a planar waveguide assembly operable to couple in the image-bearing light, wherein the planar waveguide assembly is operable to generate a virtual image display. In addition, the gesture input device is operable to detect an input gesture to initiate password entry during a software locked state, and the processing unit is operable to randomly assign a predefined set of input gestures to a predefined set of password symbols. Further, the virtual image display is operable to display an enter password screen showing the randomly assigned set of input gestures corresponding to the set of password symbols.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1A:
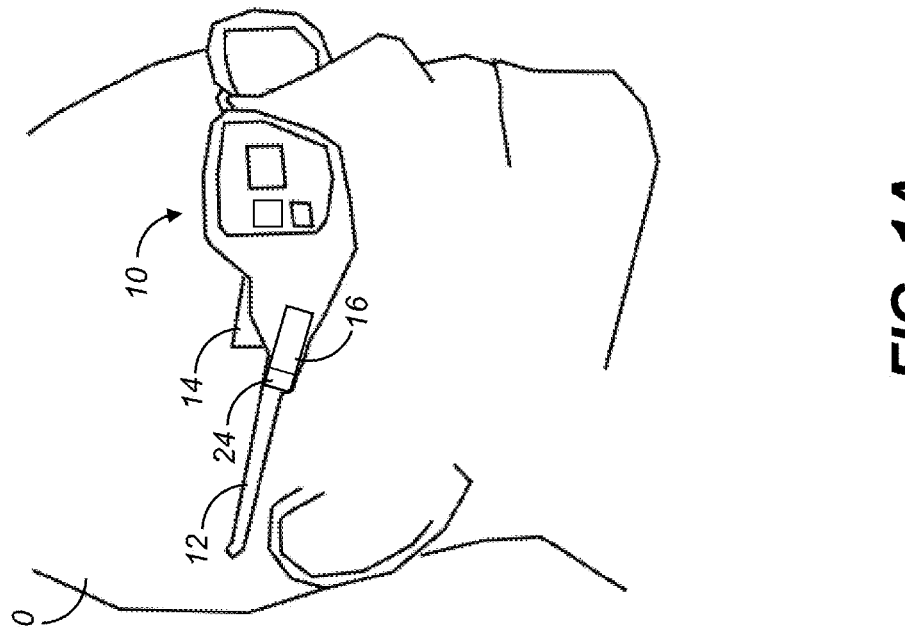
FIG. 1A shows an electronic device according to an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are considered to be equivalent and refer to the person who wears and/or views images using an electronic device.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

Head-Mounted Displays (HMDs) are developed for a range of diverse uses, including military, commercial, industrial, fire-fighting, and entertainment applications. An HMD is operable to form a virtual color image that can be visually superimposed over the real-world image that lies in the field of view of the HMD user. Optically transparent flat parallel plate waveguides, also called planar waveguides, convey image-bearing light generated by a color projector system to the HMD user. The planar waveguides convey the image-bearing light in a narrow space to direct the virtual image to the HMD user's pupil and enable the superposition of the virtual image over the real-world image that lies in the field of view of the HMD user.

In such conventional imaging light guides, collimated, relatively angularly encoded light beams from a color image projector source are coupled into an optically transparent planar waveguide assembly by an input coupling optic, such as an in-coupling diffractive optic, which can be mounted or formed on a surface of the parallel plate planar waveguide or disposed within the waveguide. Such diffractive optics can be formed as, but are not limited to, diffraction gratings or holographic optical elements. For example, the diffraction grating can be formed as a surface relief grating. After propagating along the planar waveguide, the diffracted color image-bearing light can be directed back out of the planar waveguide by a similar output grating, which may be arranged to provide pupil expansion along one or more dimensions of the virtual image. In addition, one or more diffractive turning gratings may be positioned along the waveguide optically between the input and output gratings to provide pupil expansion in one or more dimensions of the virtual image. The image-bearing light output from the parallel plate planar waveguide provides an expanded eye-box for the viewer.

An optical system, such as a HMD, can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

HMDs do not typically have keyboard devices for input. However, HMDs may have a touch sensitive pad or area on the device for gesture input. Alternatively, a camera may be utilized for capturing input gestures, or a combination of camera and touchpad input may be utilized to capture input gestures. Providing software unlock functionality using gesture-sensing and gesture-recognition input devices of the HMD affords a secure method of unlocking software locked electronic devices.

The method of unlocking a software locked electronic device may enable a user to unlock the electronic device by identifying a gesture sequence comprising at least two sequential gestures. In an embodiment, the method of unlocking a software locked electronic device includes mapping distinguishable gestures to symbols (characters and/or numbers, or other symbols) displayed to the user by a display means such as a virtual image display or a liquid crystal display (LCD), detecting a sequence of gestures from an electronic touch sensitive device and/or other gesture capturing device, converting the sequence of sensed gesture input into a sequence of symbols, and comparing the sequence of symbols to a previously defined password sequence of symbols to determine whether or not to unlock the electronic device.

As illustrated in FIG. 1A, in an embodiment, an electronic device 10 comprises a HMD in the form of eye glasses. The electronic device 10 may include at least a right temple arm 12 and a processing unit 14 having means for storing data, storing computer programs, and for executing the computer programs. Additionally, the processing unit 14 is connected to a gesture input device 16. The gesture input device 16 is operable to convey gestures to processing unit 14. In an embodiment, the gesture input device 16 is a touchpad. The gesture input device 16 is operable to receive input from one or more fingers of a user 20 and/or input from a stylus. Persons skilled in the relevant arts will recognize that where an input gesture is described as being performed by a finger of the user 20, the input gesture may also be performed by a stylus. A gesture received by the gesture input device 16 may include, without limitation, tapping the gesture input device 16, swiping/dragging across the gesture input device 16 in a front-to-rear direction, swiping/dragging across the gesture input device 16 in a rear-to-front direction, swiping/dragging across the gesture input device 16 in a top-to-bottom direction, swiping/dragging across the gesture input device 16 in a bottom-to-top direction, swiping/dragging across the gesture input device 16 in a front-to-rear and rear-to-front direction simultaneously, and vice versa, swiping/dragging across the gesture input device 16 in a bottom-to-top and a top-to-bottom direction simultaneously, and vice versa, swiping/dragging across the gesture input device 16 in a front-to-rear-to-front direction, swiping/dragging across the gesture input device 16 in a rear-to-front-to-rear direction, and swiping/dragging across the gesture input device 16 in a bottom-to-top-to-bottom direction, and swiping/dragging across the gesture input device 16 in a top-to-bottom-to-top direction. The gesture input device 16 may further detect whether one finger, two fingers, or three fingers are utilized during the gesture. The processing unit 14 may convert the sequence of gestures into a sequence of symbols suitable for comparison with a stored sequence of symbols used as the stored unlock password.

Figure 1B:
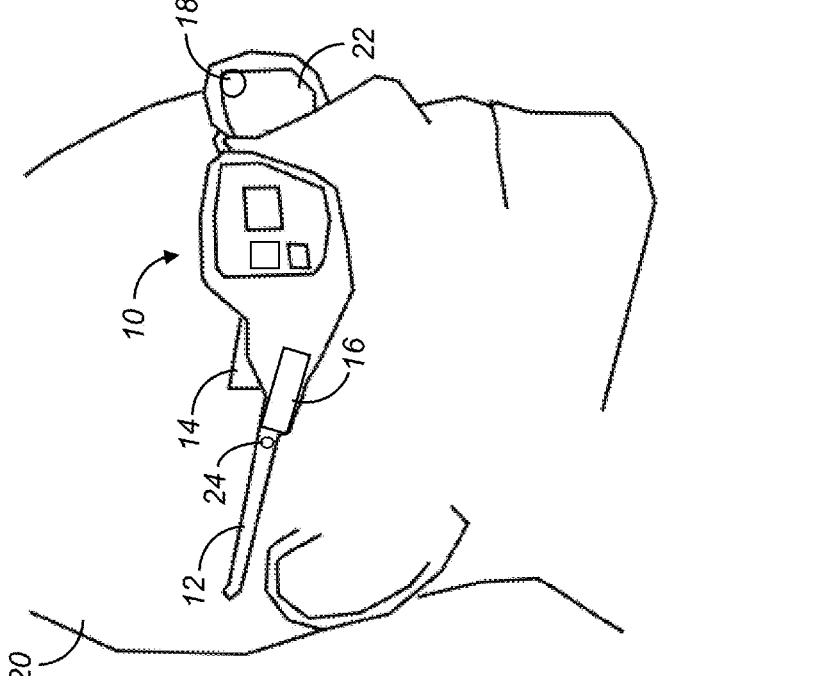
FIG. 1B shows an electronic device according to an embodiment of the present disclosure.

As illustrated in FIG. 1B, in an embodiment, the electronic device 10 may further comprise at least one camera 18 situated to view hand gestures of the user 20. In an embodiment, the camera 18 is located adjacent to an outer periphery of a lens 22 of the eye glasses. The camera 18 field of view is generally located in front of the user 20. In another embodiment, the camera 18 is located in the left or right temple arm 12 of the eye glasses and the camera 18 field of view is generally located to the side of the user 20.

The camera 18 is connected to the processing unit 14 and may be utilized to capture and recognize hand gestures of the user 20. The processor 14 is operable to convert the hand gestures captured by the camera 18 into a corresponding sequence of symbols to be compared against a stored unlock password.

Figure 2:
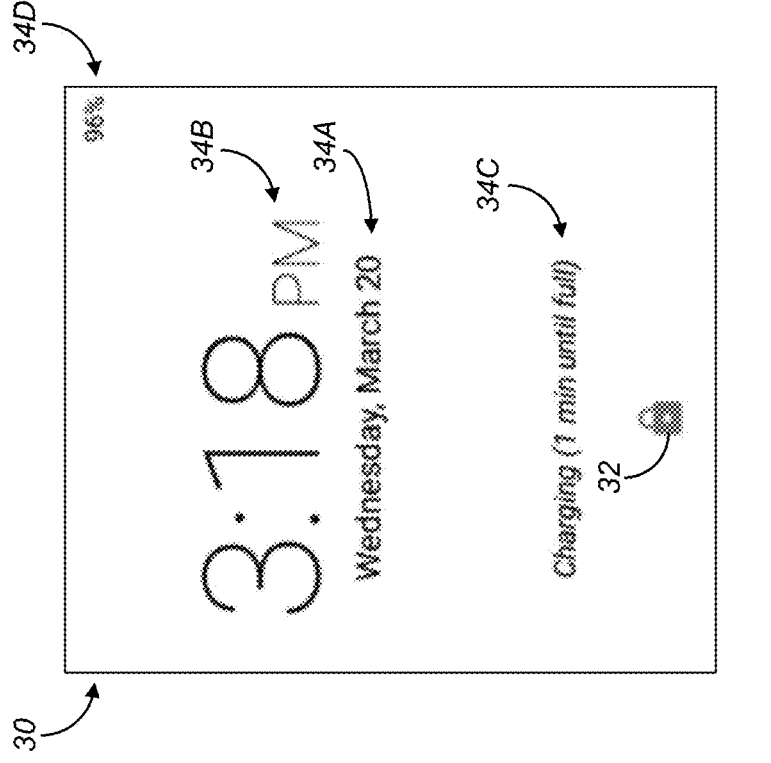
FIG. 2 shows a portion of a software lock screen display according to an embodiment of the present disclosure.

The electronic device 10 includes a display, such as, but not limited to, a virtual image display or a physical display (e.g., a screen and/or LCD). As illustrated in FIG. 2, the electronic device 10 displays a lock screen 30 (virtual or physical) to the user 20 indicating that the electronic device 10 is in a software locked state. In an embodiment, the displayed lock screen 30 comprises at least a lock icon 32 indicating the software locked state of the electronic device 10. Other icons and/or words may be displayed to notify the user 20 that the electronic device 10 is in a software locked state. Other information such as, but not limited to, date 34A, time 34B, electronic charging state 34C, and battery charge level 34D may also be displayed on the lock screen 30.

The electronic device 10 may be in, or may go into, a sleep state in which the display is turned off, thus conserving the power level of the electronic device 10 over a non-use period of time. In an embodiment, any touch of the gesture input device 16 is a wake cue to operate the electronic device 10 in a wake state. If the electronic device 10 is in a software locked state, the wake cue causes the display to present the lock screen 30. Alternatively, a specific touch pattern on the gesture input device 16 may be used to wake the electronic device 10. For example, the wake cue may be a two finger tap, a single finger held to the gesture input device 16 for a predefined period of time, or a single finger swipe gesture across the gesture input device 16. Other gestures may be defined to wake the electronic device 10. A wake state is a state of the electronic device 10 that at least allows for input from the gesture input device 16 and/or from the camera 18 and presents an image in the display of the electronic device 10. Input from other sensors, e.g., a button, a tilt/tip sensor, an accelerometer, a magnetometer, or the like, may be used to change the state of the electronic device 10 from a sleep state to a wake state, and if in a software locked state, will cause the lock screen 30 to be displayed.

Figure 3:
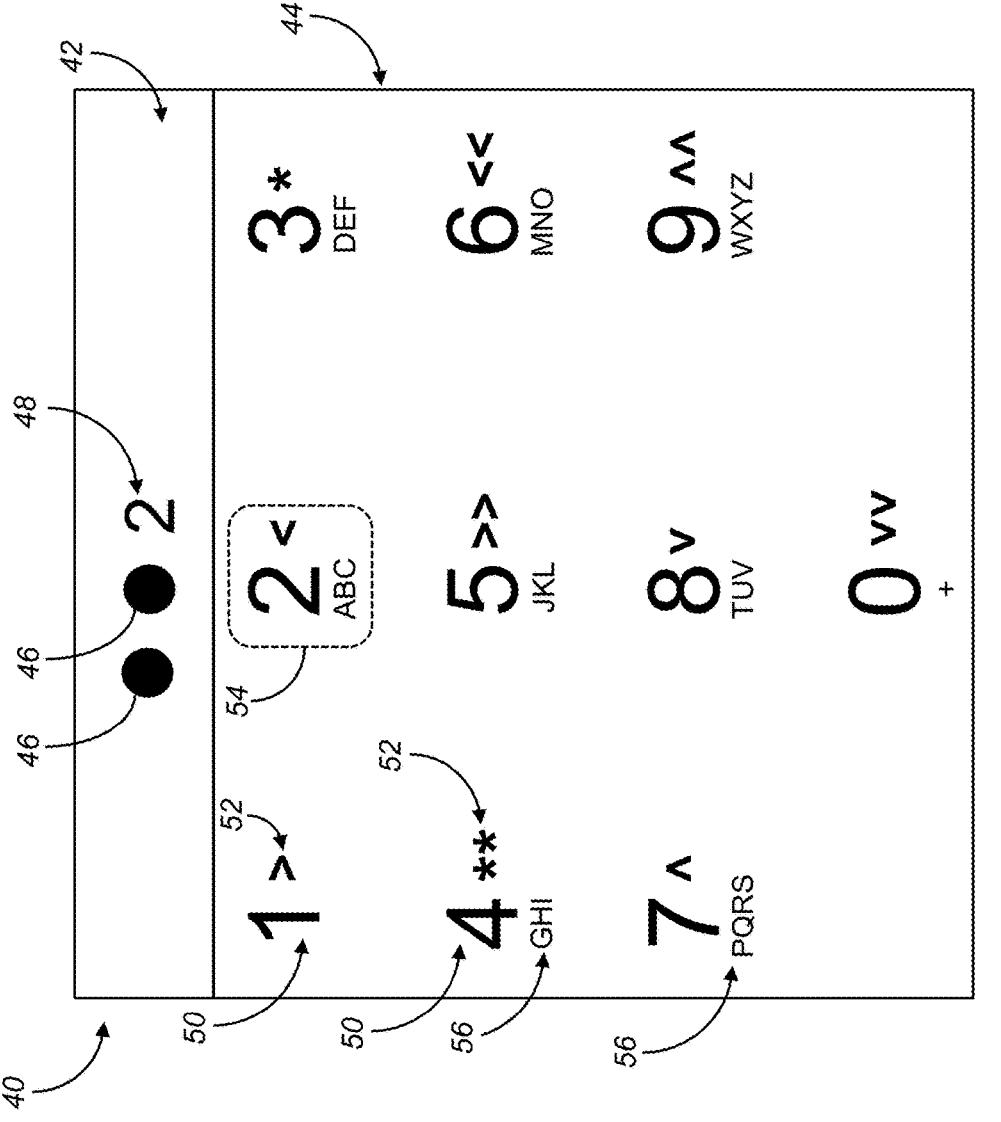
FIG. 3 shows a portion of an enter password screen according to an embodiment of the present disclosure.

In an embodiment, a touch of the gesture input device 16 initiates the software unlock method (see FIGS. 5-10). As illustrated in FIG. 3, when the user 20 initiates the software unlock method, an enter password screen 40 (virtual or physical) is displayed to the user 20. The enter password screen 40 may comprise a password display region 42 in which the entered password symbols 48 are displayed as the user 20 enters the gesture sequence. In an embodiment, the entered password symbols 48 may be temporarily displayed in the password display region 42. After a predetermined time period, the entered password symbols 48 may be overwritten or replaced by a masking symbol 46 to hide the entered password symbols 48. The masking symbol 46 may be a circle, a square, or the like to indicate that an entered password symbol 48 has been input without displaying the entered password symbol 48. In this way, the user 20 can track and know which password characters have already been entered. The entered password symbol 48 also informs the user 20 which gesture the electronic device 10 has recognized by the user's input gesture.

With continued reference to FIG. 3, in an embodiment, the enter password screen 40 also includes a gesture map region 44 in which a set of password symbols 50 are displayed together with corresponding gesture symbols 52. The gesture symbols 52 indicate the input gestures that can be used with the gesture input device 16 and/or camera 18 for entering a sequence of the password symbols 50. As shown in FIG. 3, in an embodiment, the complete set of password symbols 50 is the set {1, 2, 3, 4, 5, 6, 7, 8, 9, 0}. The password symbols 50 may alternatively be the set {A, B, C, D, E, F, G, H, I, J, K, L, M, N, O, P, Q, R, S, T, U, V, W, X, Y, Z, +}. Other symbol sets, for example geometric shapes, may also be utilized as the password symbols 50.

As illustrated in FIG. 3, in an embodiment, a set of password sub-symbols 56 is displayed below the password symbols 50. The password sub-symbols 56 enable the password to be comprised of a mixture of symbols from the different symbol sets 50, 56. The corresponding gestures may be indicated by displaying gesture symbols 52 next to the password symbols 50 and/or the password sub-symbols 56. In an embodiment, the gesture symbols 52 and their corresponding input gesture with respect to the gesture input device 16 and/or the camera 18 is as follows: ">" indicates a single finger forward swipe gesture, "<" indicates a single finger backward swipe gesture, "*" indicates a single finger tap gesture, "" indicates a two finger tap gesture, ">>" indicates a two finger forward swipe gesture, "<<" indicates a two finger backward swipe gesture, "Δ" indicates a single finger bottom to top swipe gesture, "V" indicates a single finger top to bottom swipe gesture, "ΔΔ" indicates a two finger bottom to top swipe gesture, and "VV" indicates a two finger top to bottom swipe gesture. Two finger input gestures mean that two fingers are used to touch the gesture input device 16 at the same time. Alternative gesture symbols 52 may be used to indicate the password symbols 50 and password sub-symbols 56**.

Figure 4:
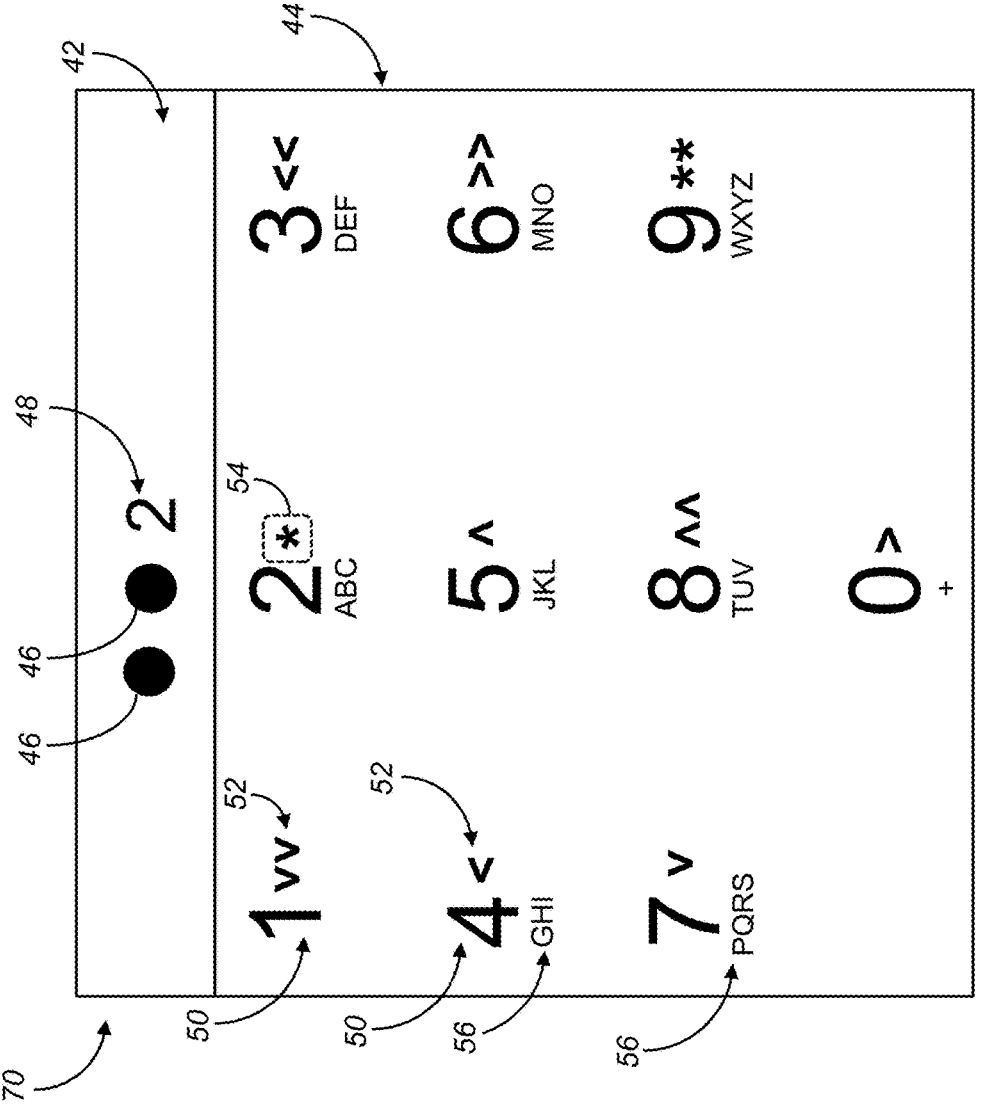
FIG. 4 shows a portion of an enter password screen according to an embodiment of the present disclosure.

When an input gesture is performed, in addition to displaying the entered password symbols 48 in the password display region 42, the gesture symbol 52 may be highlighted in the gesture map region 44. Said highlighting may include any one of, or combinations of, changing the color of the gesture symbol 52, changing the gesture symbol 52 font style (e.g., italic and or bold versus regular), underlining the gesture symbol 52, and/or displaying a box 54 or circle around the symbol. As illustrated in FIG. 3, in an embodiment, the box 54 highlighting the gesture symbol 52 when the corresponding input gesture is performed may comprise one or more broken/dotted lines located about both the password symbol and sub-symbols 50, 52 and the gesture symbol 52. As illustrated in FIG. 4, in an embodiment, the box 54 highlighting the gesture symbol 52 when the corresponding input gesture is performed is located about the gesture symbol 52.

Other input gestures may be utilized for other functionality during a software unlock method. For example, a three figure tap on the gesture input device 16 may be used to indicate that the password entry input sequence is to start over at the beginning, erasing any previously entered password symbols. Alternatively, a single finger held to the gesture input device 16 for at least a predefined time interval, e.g., two seconds, may be used to indicate that the enter password input sequence is to start over, erasing any previously entered password symbols.

When the camera 18 is utilized as an input gesture capturing device, a "swipe" may be the movement of one or more fingers in the field of view of the camera 18. For example, a forward swipe may be a left to right movement of one or more fingers, a backward swipe may be a right to left movement of one or more fingers, an upward swipe may be a vertical movement of one or more fingers from bottom to top, and a downward swipe may be a vertical movement of one or more fingers from top to bottom. A "tap" gesture may be the motion of bending one or more fingers in the field of view of the camera 18.

As illustrated in FIG. 4, an enter password screen 70 includes randomly assigned gesture symbols 52. When a software unlock method begins, the input gestures may be randomly assigned to the password symbols 50 and password sub-symbols 56. In this way, someone observing the user 20 and seeing the sequence of input gestures used to unlock the electronic device 10 will not be able to unlock the electronic device 10 by utilizing the same gesture sequence. Thus, the input gesture sequence can be made public or can be observed by the public without revealing the actual unlocking password.

Figure 5:
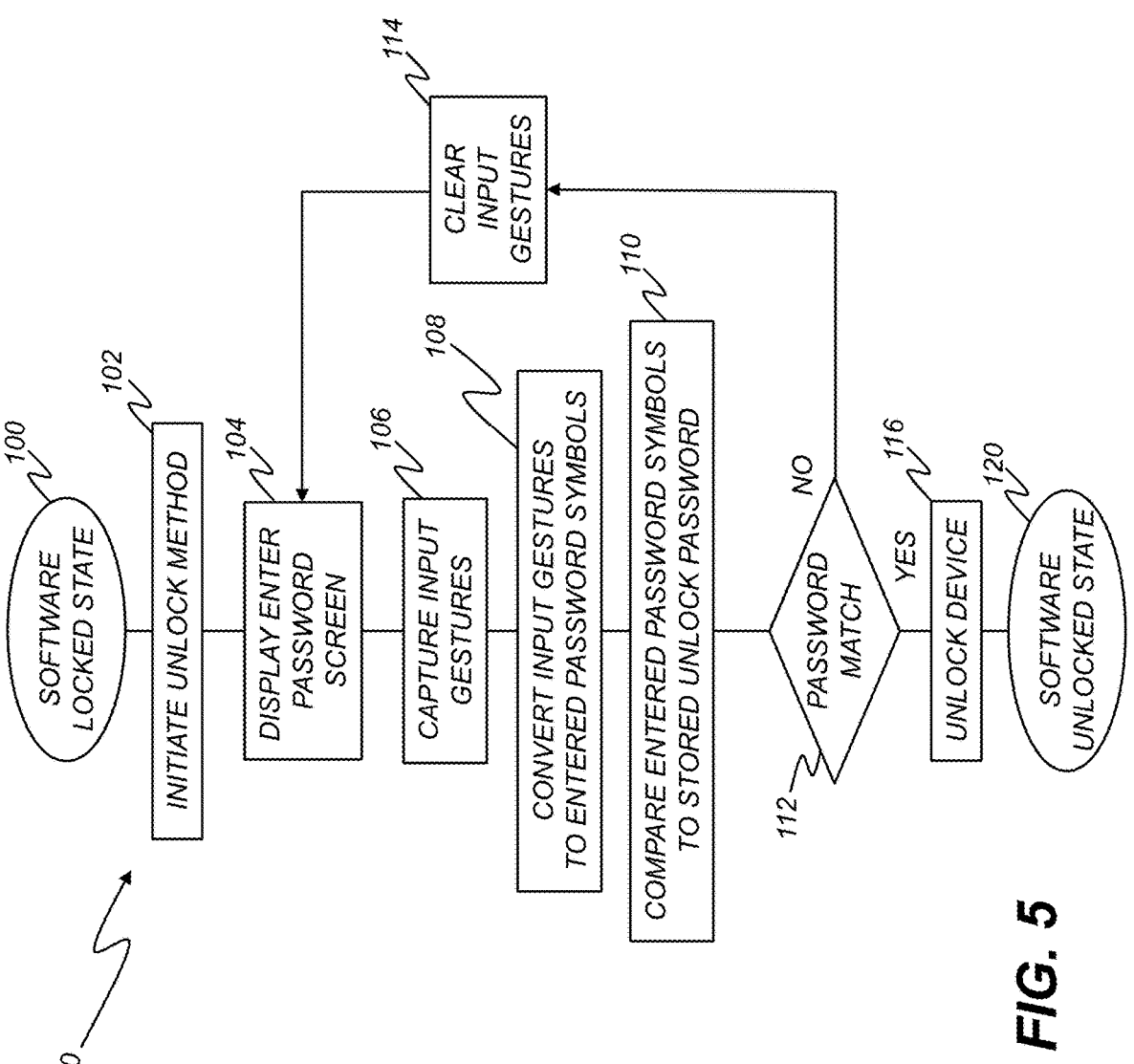
FIG. 5 is a flow chart of a software unlock method according to an embodiment of the present disclosure.

As illustrated in FIG. 5, in an embodiment, the software unlock method 90 starts with the electronic device 10 in a software locked state 100. To initiate the software unlock method 90, in step 102 the user 20 provides an input gesture to the gesture input device 16 and/or the camera 18. In an embodiment, the input gesture to initiate the software unlock method 90 is one or more taps. In an embodiment, the software unlock method 90 is initiated by depressing a button 24 of the electronic device 10. Step 102 may include the random assignment of the input gestures 52 to the password symbols and sub-symbols 50, 56. The next step 104 of the software unlock method 90 clears any previously entered input gestures and causes the display to present the enter password screen 40. Step 106 captures the input gestures of the user 20. Step 108 converts the input gestures into the entered password symbols 48 (also known as input characters). In step 110, the entered password symbols 48 are compared to the stored unlock password. Step 110 may be initiated by the user 20 providing an input gesture indicating that the password entry sequence is complete. For example, the "enter" password input gesture may be a simultaneous top-to-middle and bottom-to-middle finger swipe, i.e., a pinch. Step 112 takes action based on the comparison of the entered password symbols 48 to the stored unlock password. The comparison indicates that the entered password symbols 48 either do or do not match the stored unlock password. If the entered password symbols 48 match the stored unlock password then the software unlock method 90 proceeds to step 116. In step 116 the electronic device 10 is unlocked and the software is operable as indicated in step 120. If the entered password symbols 48 do not match the stored unlock password, the software unlock method 90 proceeds to step 114 and the entered password symbols 48 are cleared. The software unlock method 90 then returns to step 104 so that another sequence of input gestures can be obtained. Step 114 may also include the random assignment of the input gestures 52 to the password symbols and sub-symbols 50, 56.

Figure 6:
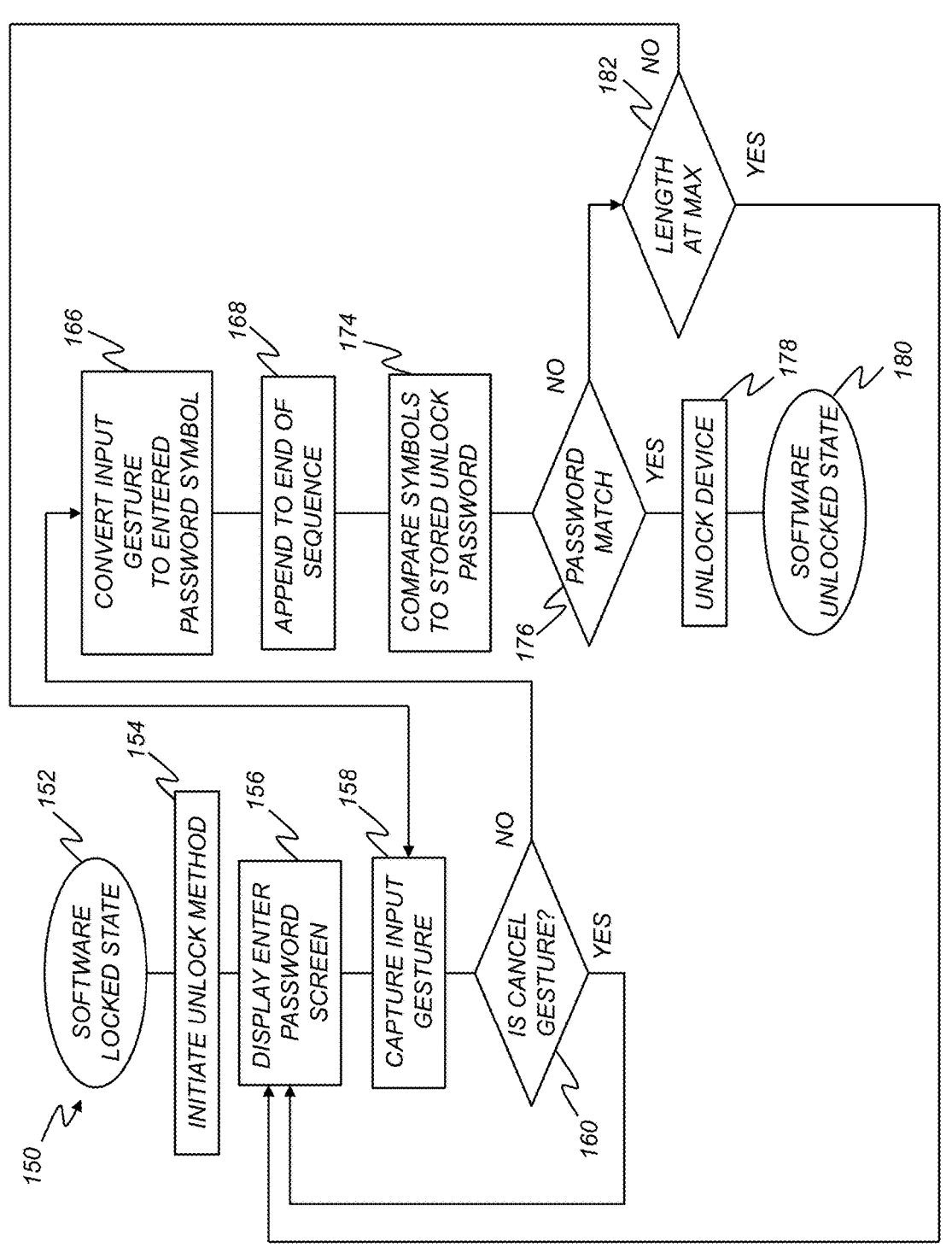
FIG. 6 is a flow chart of a software unlock method according to an embodiment of the present disclosure.

As illustrated in FIG. 6, in an embodiment, a software unlock method 150 starts with the electronic device 10 in a software locked state 152. Step 154 initiates the software unlock method 152. In an embodiment, an input gesture to initiate the software unlock method 150 may be one or more taps. In an embodiment, the software unlock method 90 is initiated by depressing the button 24 of the electronic device 10. Step 156 clears any previous input gestures and displays the enter password screen 40. Step 156 may also include the random assignment of the input gestures 52 to the password symbols and sub-symbols 50, 56. Step 158 captures a single input gesture. Step 160 compares this input gesture to a predefined cancel gesture. If the input gesture is the cancel gesture, the software unlock method 150 returns to step 156. In an embodiment, the cancel gesture may be a timeout period in which no input gesture is recognized/captured. In another embodiment, the cancel gesture may be a single finger touching the gesture input device 16 for a predefined period of time, e.g., two seconds. In yet another embodiment, the cancel gesture may be a three-finger touch of the gesture input device 16.

If the input gesture is not the cancel gesture, then the software unlock method 150 proceeds to step 166 in which the input gesture is converted to an entered password symbol 48. Step 168 appends the entered password symbol 48 to the end of any sequence of entered password symbols 48 thus far accumulated. Step 174 compares the current sequence of entered password symbols 48 to the stored unlock password. In step 176, if the accumulated entered password symbols 48 match the stored unlock password, the software unlock method 150 proceeds to step 178. In step 178 the electronic device 10 is unlocked, and the software is operable in a software unlocked state 180. If the accumulated entered password symbols 48 do not match the stored unlock password, the software unlock method 150 proceeds to step 182. In step 182 the number of accumulated entered password symbols 48 is compared to the maximum allowed number of input gestures. If the number of accumulated entered password symbols 48 is at the maximum allowed number of input gestures, then the software unlock method 150 returns to step 156. If the number of accumulated entered password symbols 48 is less than the maximum allowed number thereof, then the software unlock method 150 returns to step 158 in which another input gesture is captured.

Figure 7:
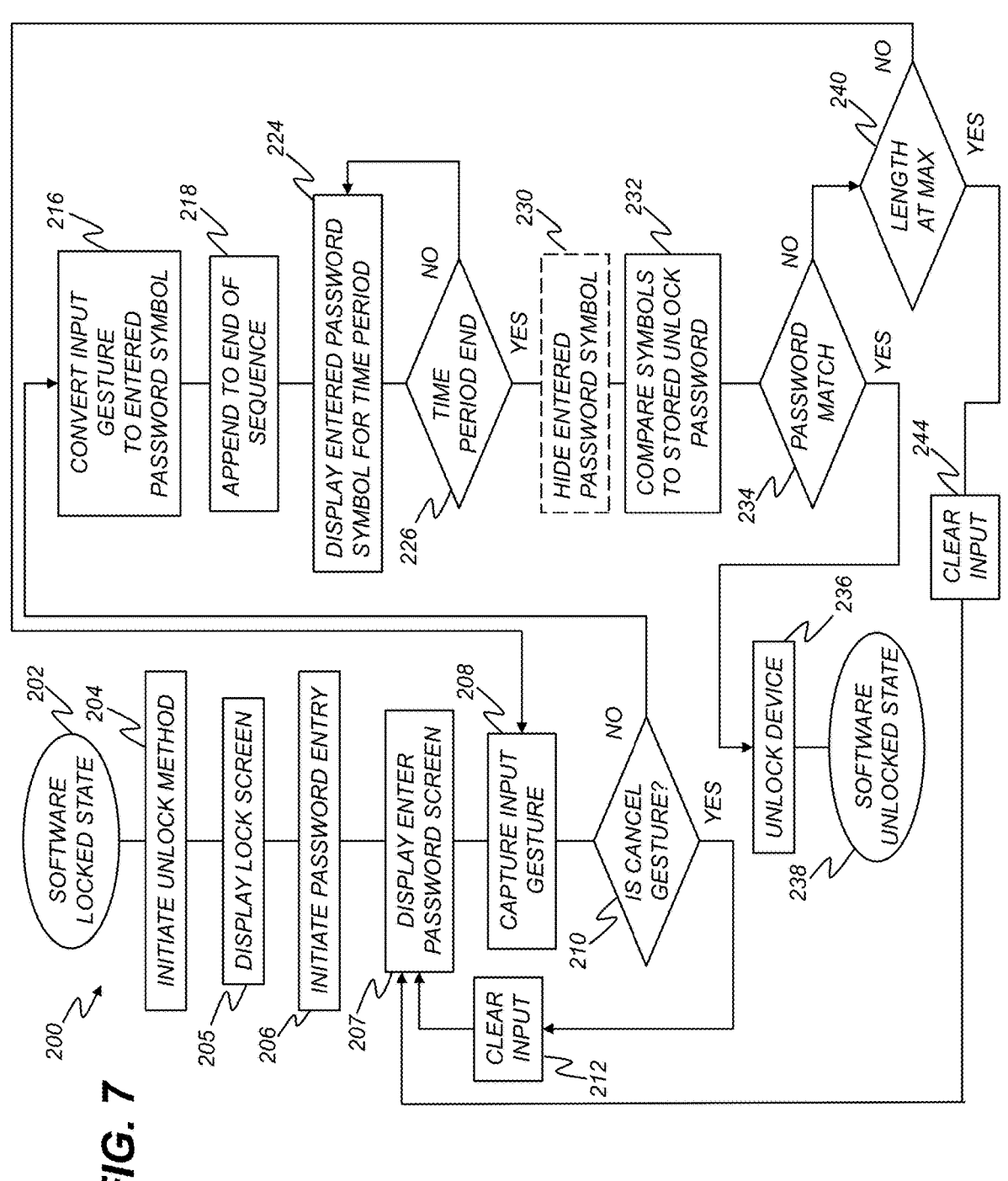
FIG. 7 is a flow chart of a software unlock method according to an embodiment of the present disclosure.

As illustrated in FIG. 7, in an embodiment, a software unlock method 200 starts with the electronic device 10 in a software locked state 202. In the software locked state 202 the electronic device 10 is also in a sleep state in which the display is turned off. Step 204 initiates the software unlock method 200 via a wake cue. In an embodiment, the wake cue is depressing the button 24 of the electronic device 10. In an embodiment, the wake cue is a touch of the gesture input device 16. The wake cue causes the display to present the lock screen 30 in step 205. In step 206 the user 20 initiates password entry via an input gesture such as, but not limited to, a touch of the gesture input device 16, a virtual touch of the camera 18, or depressing the button 24 of the electronic device 10. Step 206 may also include the random assignment of the input gestures 52 to the password symbols and sub-symbols 50, 56. Initiating password entry causes the display to present the enter password screen 40 in step 207.

In the next step 208, an input gesture is captured. In step 210, a comparison is made of the captured input gesture and a predefined cancel gesture used to indicate a cancelation of the password input sequence. In an embodiment, the cancel gesture is a timeout period in which no input gesture is recognized/captured. In another embodiment, the cancel gesture may be a single finger touching the gesture input device 16 for a predefined period of time, e.g., two seconds. In yet another embodiment, the cancel gesture may be a three-finger touch of the gesture input device 16. If the input gesture is the cancel gesture, the software unlock method 200 clears any previously entered password symbols 48 in step 212 and returns to step 207 to display the electronic device enter password screen 40, 70. Step 212 may also include the random assignment of the input gestures 52 to the password symbols and sub-symbols 50, 56.

If the input gesture is not the cancel gesture, the software unlock method 200 proceeds to step 216 in which the input gesture is converted to an entered password symbol 48 or an input character. Step 218 appends the entered password symbol 48 or character to the end of the sequence of entered password symbols 48 or characters thus far accumulated. In step 224 the entered password symbol 48 or character is displayed in the password display region 42. The entered password symbol 48 or character is displayed for a predetermined, usually short, time interval. In step 226, the time interval for which the entered password symbol 48 has been displayed is compared to a set/predefined time period. Step 226 may include comparing the time interval in which the entered password symbol 48 has been displayed against the set time period a predefined number of times every second. For example, step 226 may compare the time interval against the set time period every tenth of a second. If the time interval for which the entered password symbol 48 has been displayed does not match or exceed the set time period, the software unlock method 200 returns to step 224. If the time interval for which the entered password symbol 48 has been displayed exceeds the set time period, the software unlock method 200 performs step 230 and the masking symbol 46 is displayed instead of the entered password symbol 48 or character corresponding to the entered input gesture. In this way, the entered password symbol 48 or characters of the entered password are removed from the password display region 42.

Step 232 then compares the sequence of entered password symbols 48, thus far entered, to the stored unlock password. In step 234, if the accumulated entered password symbols 48 match the stored unlock password, the software unlock method 200 proceeds to step 236. In step 236 the electronic device 10 is unlocked and the software is operable in a software unlocked state 238. In an embodiment, the step 230, displaying the masking symbol 46 after the set time period, occurs simultaneously to step 232 in which the sequence of entered password symbols 48 are compared to the stored unlock password. In other words, in an embodiment, the timer of step 230 operates independently of step 232.

If the sequence of entered password symbols 48 do not match the stored unlock password, the software unlock method 200 proceeds to step 240. In step 240 the number of accumulated entered password symbols 48 is compared to the maximum allowed number of input gestures and/or entered password symbols 48. If the number of accumulated entered password symbols 48 is at the maximum allowed number, then the software unlock method 200 clears the entered password symbols 48 in step 244 and returns to step 207. If the number of accumulated entered password symbols 48 is less than the maximum allowed number thereof, then the software unlock method 200 returns to step 208 in which another input gesture is captured.

Figure 8:
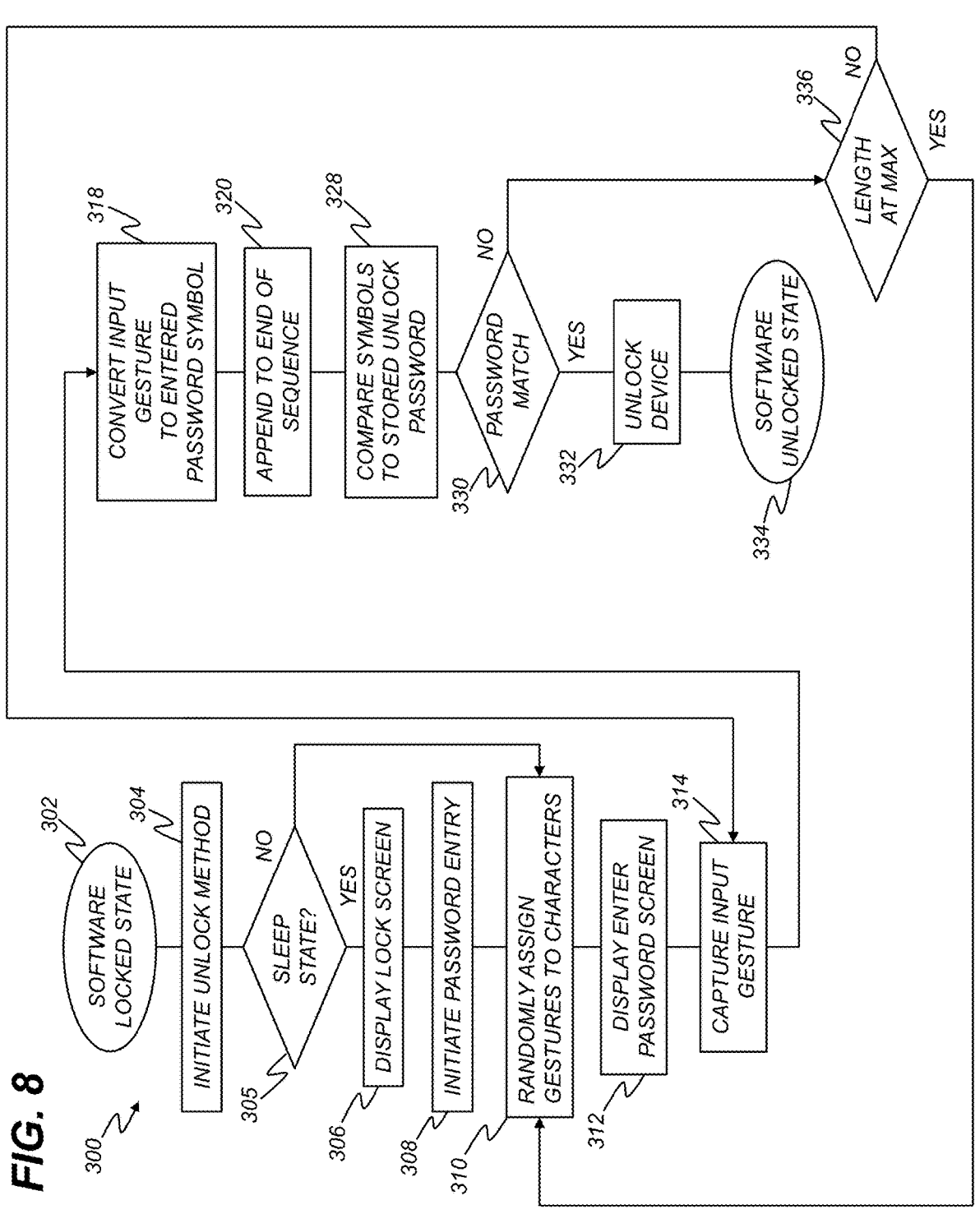
FIG. 8 is a flow chart of a software unlock method according to an embodiment of the present disclosure.

As illustrated in FIG. 8, in an embodiment, a software unlock method 300 starts with the electronic device 10 in a software locked state 302. In the software locked state 302 the electronic device 10 may be in a sleep state in which the display is turned off. Step 304 initiates the software unlock method 300 via an input gesture such as one or more taps on the input gesture device 16 or via depression of the electronic device button 24. Step 304 may allocate computer memory, or set initial values to computer variables, etc. Step 305 determines if the electronic device 10 is in a sleep state. If the electronic device 10 is in a sleep state, the display is caused to present the lock screen 30 in step 306. In step 308 the user 20 initiates password entry via an input gesture such as, but not limited to, a touch of the gesture input device 16 or virtual touch of the camera 18. Initiating password entry causes the software unlock method 300 to randomly assign input gestures, and their corresponding gesture symbols 52, to the password symbols 50, 56 in step 310. If, in step 305, the software unlock method 300 determines that the electronic device 10 is not in a sleep state, the software unlock method 300 proceeds to step 310.

Step 310 also clears any previously entered password symbols 48 and/or input gestures from previous attempts to enter the stored unlock password. The display then presents the enter password screen 40 in step 312. In the next step 314, an input gesture is captured. In step 316, a comparison is made of the captured input gesture and a predefined cancel gesture used to indicate a cancelation of the password input sequence. In an embodiment, the cancel gesture is a timeout period in which no input gesture is recognized/captured. In another embodiment, the cancel gesture may be a single finger touching the gesture input device 16 for a predefined period of time, e.g., two seconds. In yet another embodiment, the cancel gesture may be a three-finger touch of the gesture input device 16. If the input gesture is the cancel gesture, the software unlock method 300 returns to step 310 to clear any previously entered password symbols 48 and randomly assign input gestures, and their corresponding gesture symbols 52, to the password symbols 50, 56.

If the input gesture is not the cancel gesture, the software unlock method 300 proceeds to step 318 in which the input gesture is converted to an entered password symbol 48. Step 320 appends the entered password symbol 48 to the end of any previously entered sequence of entered password symbols 48. Step 328 then compares the sequence of entered password symbols 48, thus far entered, to the stored unlock password. In step 330, if the accumulated entered password symbols 48 match the stored unlock password, the software unlock method 300 proceeds to step 332. In step 332 the electronic device 10 is unlocked and the software is operable in a software unlocked state 334. If, in step 330, the sequence of entered password symbols 48 do not match the stored unlock password, the software unlock method 300 proceeds to step 336. In step 336 the number of accumulated entered password symbols 48 is compared to the maximum allowed number of entered password symbols 48. If the number of accumulated entered password symbols 48 is at the maximum allowed number, then the software unlock method 300 returns to step 310 and clears the entered password symbols 48. If the number of accumulated entered password symbols 48 is less than the maximum allowed number thereof, then the software unlock method 300 returns to step 314 in which another input gesture is captured.

Figure 9:
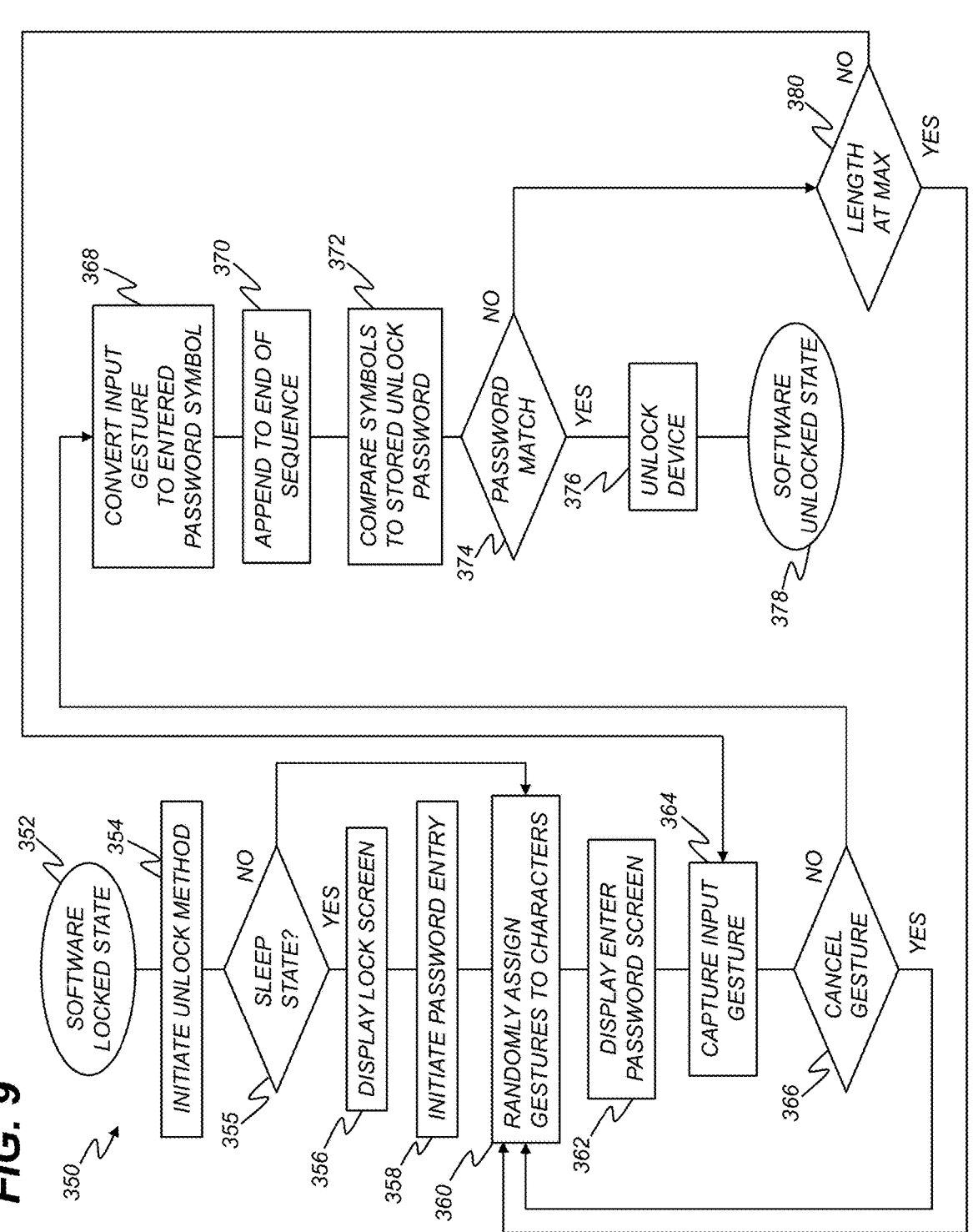
FIG. 9 is a flow chart of a software unlock method according to an embodiment of the present disclosure.

As illustrated in FIG. 9, in an embodiment, a software unlock method 350 starts with the electronic device 10 in a software locked state 352. In the software locked state 352 the electronic device 10 may be in a sleep state in which the display is turned off. Step 354 initiates the software unlock method 350 via an input gesture such as, but not limited to, one or more taps on the input gesture device 16 or depressing the button 24 of the electronic device 10. Step 354 may allocate computer memory to, for example, hold captured input gestures or set initial values to computer variables. Step 355 determines if the electronic device 10 is in a sleep state. If the electronic device 10 is in a sleep state, the display is caused to present the lock screen 30 in step 356. In step 358 the user 20 initiates password entry via an input gesture such as, but not limited to, a touch of the gesture input device 16 or virtual touch of the camera 18. Initiating password entry causes the software unlock method 350 to randomly assign input gestures, and their corresponding gesture symbols 52, to the password symbols 50, 56 in step 360. If, in step 355, the software unlock method 350 determines that the electronic device 10 is not in a sleep state, the software unlock method 300 proceeds to step 360.

Step 360 also clears any previously entered password symbols 48 and/or input gestures from previous attempts to enter the stored unlock password. The display then presents the enter password screen 40 in step 362. In the next step 364, an input gesture is captured. In step 366, a comparison is made of the captured input gesture and a predefined cancel gesture used to indicate a cancelation of the password input sequence. In an embodiment, the cancel gesture is a timeout period in which no input gesture is recognized/captured. In another embodiment, the cancel gesture may be a single finger touching the gesture input device 16 for a predefined period of time, e.g., two seconds. In yet another embodiment, the cancel gesture may be a three-finger touch of the gesture input device 16. If the input gesture is the cancel gesture, the software unlock method 350 returns to step 360 to clear any previously entered password symbols 48 and to randomly assign input gestures, and their corresponding gesture symbols 52, to the password symbols 50, 56.

If the input gesture is not the cancel gesture, the software unlock method 350 proceeds to step 368 in which the input gesture is converted to an entered password symbol 48. Step 370 appends the entered password symbol 48 to the end of any previously entered sequence of entered password symbols 48.

Step 372 then compares the sequence of entered password symbols 48, thus far entered, to the stored unlock password. In step 374, if the accumulated entered password symbols 48 match the stored unlock password, the software unlock method 350 proceeds to step 376. In step 376 the electronic device 10 is unlocked and the software is operable in a software unlocked state 378. If, in step 374, the sequence of entered password symbols 48 do not match the stored unlock password, the software unlock method 350 proceeds to step 380. In step 380 the number of accumulated entered password symbols 48 is compared to the maximum allowed number of entered password symbols 48. If the number of accumulated entered password symbols 48 is at the maximum allowed number, then the software unlock method 350 returns to step 360 and clears the entered password symbols 48. If the number of accumulated entered password symbols 48 is less than the maximum allowed number thereof, then the software unlock method 350 returns to step 364 in which another input gesture is captured.

Figure 10:
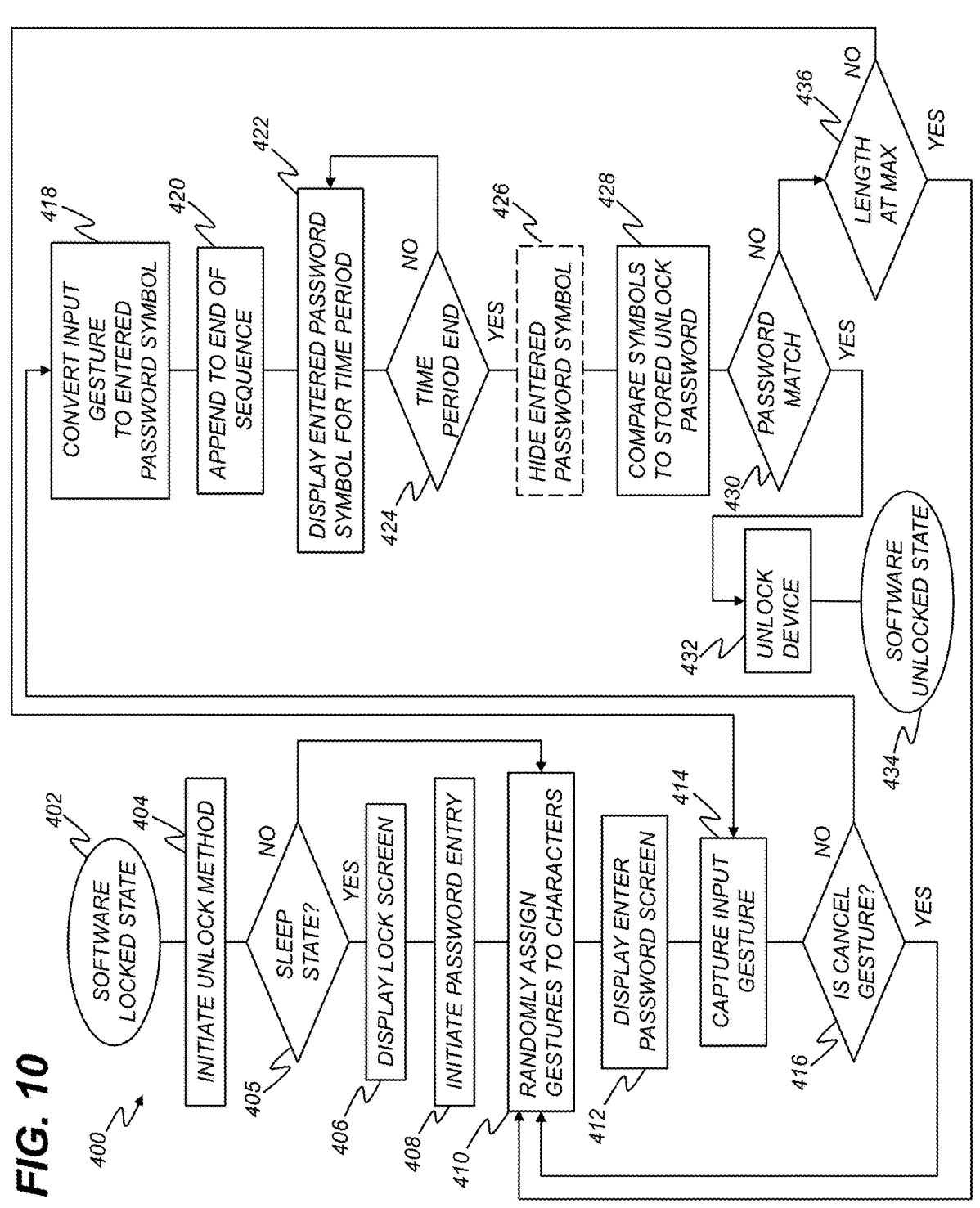
FIG. 10 is a flow chart of a software unlock method according to an embodiment of the present disclosure.

As illustrated in FIG. 10, in an embodiment, a software unlock method 400 starts with the electronic device 10 in a software locked state 402. In the software locked state 402 the electronic device 10 may be in a sleep state in which the display is turned off. Step 404 initiates the software unlock method 400 via an input gesture such as one or more taps on the input gesture device 16 or depressing the button 24 of the electronic device 10. Step 404 may allocate computer memory, or set initial values to computer variables, etc. Step 405 determines if the electronic device 10 is in a sleep state. If the electronic device 10 is in a sleep state, the display is caused to present the lock screen 30 in step 406. In step 408 the user 20 initiates password entry via an input gesture such as, but not limited to, a touch of the gesture input device 16 or virtual touch of the camera 18. Initiating password entry causes the software unlock method 400 to randomly assign input gestures, and their corresponding gesture symbols 52, to the password symbols 50, 56 in step 410. If, in step 405, the software unlock method 400 determines that the electronic device 10 is not in a sleep state, the software unlock method 400 proceeds to step 410.

Step 410 also clears any previously entered password symbols 48 and/or input gestures from previous attempts to enter the stored unlock password. The display then presents the enter password screen 40 in step 412. In the next step 414, an input gesture is captured. In step 416, a comparison is made of the captured input gesture and a predefined cancel gesture used to indicate a cancelation of the password input sequence. In an embodiment, the cancel gesture is a timeout period in which no input gesture is recognized/captured. In another embodiment, the cancel gesture may be a single finger touching the gesture input device 16 for a predefined period of time, e.g., two seconds. In yet another embodiment, the cancel gesture may be a three-finger touch of the gesture input device 16. If the input gesture is the cancel gesture, the software unlock method 400 returns to step 410 to clear any previously entered password symbols 48 and randomly assign input gestures, and their corresponding gesture symbols 52, to the password symbols 50, 56.

If the input gesture is not the cancel gesture, the software unlock method 400 proceeds to step 418 in which the input gesture is converted to an entered password symbol 48. Step 420 appends the entered password symbol 48 to the end of any previously entered sequence of entered password symbols 48. In step 422 the entered password symbol 48 is displayed in the password display region 42 of the enter password screen 40. The entered password symbol 48 is displayed for a predetermined, usually short, time interval. In step 424, the time interval for which the entered password symbol 48 has been displayed is compared to a set/predefined time period. If the time interval for which the entered password symbol 48 has been displayed does not match or exceed the set time period, the software unlock method 400 returns to step 422. If the time interval for which the entered password symbol 48 has been displayed exceeds the set time period, the software unlock method 400 performs step 426 and the masking symbol 46 is displayed instead of the entered password symbol 48. In an embodiment, the step 426, displaying the masking symbol 46 after the set time period, occurs simultaneously to step 428 described below. In other words, in an embodiment, the timer of step 426 operates independently of step 428.

Step 428 then compares the sequence of entered password symbols 48, thus far entered, to the stored unlock password. In step 430, if the accumulated entered password symbols 48 match the stored unlock password, the software unlock method 400 proceeds to step 432. In step 432 the electronic device 10 is unlocked and the software is operable in a software unlocked state 434. If, in step 430, the sequence of entered password symbols 48 do not match the stored unlock password, the software unlock method 400 proceeds to step 436. In step 436 the number of accumulated entered password symbols 48 is compared to the maximum allowed number of entered password symbols 48. If the number of accumulated entered password symbols 48 is at the maximum allowed number, then the software unlock method 400 returns to step 410 and clears the entered password symbols 48. If the number of accumulated entered password symbols 48 is less than the maximum allowed number thereof, then the software unlock method 400 returns to step 414 in which another input gesture is captured.

When an input gesture is recognized in the various software unlock methods, the corresponding entered password symbol 48 displayed in the password display region 42 of the enter password screen 40, 70 may be highlighted in the gesture map region 44 to indicate to the user which entered password symbol 48 has been recognized by the electronic device 10 as the symbol or character associated with the input gesture. In an embodiment, the highlighting of the entered password symbol 48 is the displaying of a border 54 around the corresponding password symbol 50 and/or password sub-symbol 56 in the gesture map region 44. In another embodiment, the highlighting of the entered password symbol 48 is a change in the color of the password symbol 50 and/or password sub-symbol 56 in the gesture map region 44. In yet another embodiment, the highlighting of the entered password symbol 48 is the displaying of the password symbol 50 and/or password sub-symbol 56 in the gesture map region 44 against a background color different than the background color of the rest of the gesture map region 44. In still another embodiment, the highlighting of the entered password symbol 48 is the blinking display of the password symbol 50 and/or password sub-symbol 56 in the gesture map region 44 for a period of time. In another embodiment, the entered password symbol 48 may be highlighted in the gesture map region 44 in any combination of the aforementioned manners.

Figure 11:
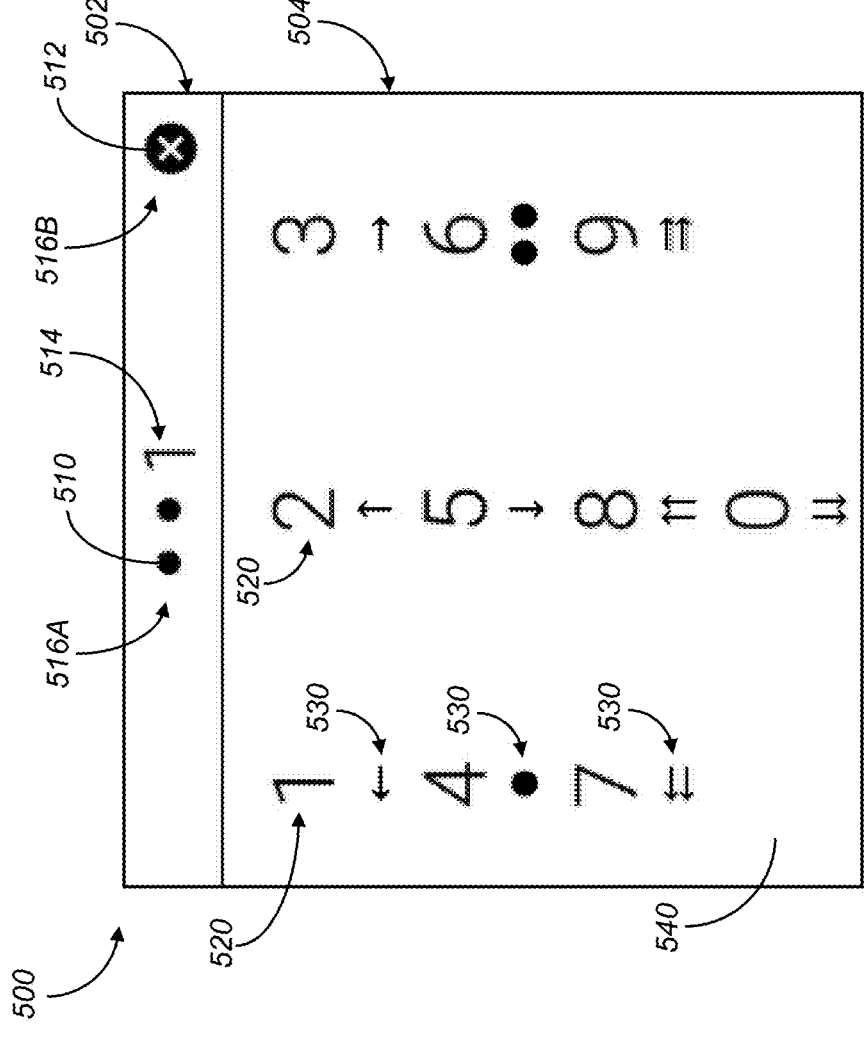
FIG. 11 shows a portion of an enter password screen according to an embodiment of the present disclosure.

As illustrated in FIG. 11, in an embodiment, an enter password screen 500 comprises a password display region 502 and a gesture map region 504. In the gesture map region 504 a set of password symbols 520 are displayed together with corresponding gesture symbols 530. The input gestures corresponding to the gesture symbols 530 can be used with the gesture input device 16 and/or camera 18 to enter symbol sequences (e.g., the stored unlock password). The password display region 502 may comprise a first section 516A for displaying the entered password symbols 514. The password display region 502 may also comprise a second section 516B for selectively displaying a symbol 512 used to indicate that a cancel gesture has been entered. When an input gesture is recognized and converted to an entered password symbol 514, the entered password symbol 514 may be displayed in the first section 516A of the password display region 502 for a predefined time period, e.g., ten seconds. After the entered password symbol 514 has been displayed for the predefined time period, the entered password symbol 514 is replaced with a mask symbol 510 that is used to conceal the entered password symbol 514.

As shown in FIG. 11, the complete set of password symbols 520 is the set {1, 2, 3, 4, 5, 6, 7, 8, 9, 0}. The password symbols 520 may additionally or alternatively be the set {A, B, C, D, E, F, G, H, I, J, K, L, M, N, O, P, Q, R, S, T, U, V, W, X, Y, Z, +}. Other symbol sets may be utilized. The corresponding input gestures may be indicated by displaying the gesture symbols 530 next to the password symbols 520. In an embodiment, the gesture symbols 530 and their corresponding input gesture with respect to the gesture input device 16 and/or camera 18 is as followings: "→" indicates a single finger forward swipe gesture, "←" indicates a single finger backward swipe gesture, "•" indicates a single finger tap gesture, "••" indicates a two finger tap gesture, "⇉" indicates a two finger forward swipe gesture, "⇇" indicates a two finger backward swipe gesture, "↑" indicates a single finger bottom to top swipe gesture, "↓" indicates a single finger top to bottom swipe gesture, "↑↑" indicates a two finger bottom to top swipe gesture, "↓↓" indicates a two finger top to bottom swipe gesture, "⇆" indicates a single finger rear-to-front-to-rear swipe gesture, "→←" indicates a two finger simultaneous forward-to-backward and backward-to-forward swipe gesture (i.e., horizontal pinch). When utilizing the gesture input device 16, two finger input gestures mean that two fingers are used to touch the gesture input device 16 at the same time. When utilizing the camera 18, two finger input gestures mean that two fingers are used at the same time to perform an input gesture. Alternative gesture symbols 530 may be used to correspond to the input gestures. As described supra, other input gestures may be utilized for other functionality during the software unlock method and/or password entry.

In an embodiment, the background 540 of the enter password screen 500 is transparent, or partially transparent, and the displayed symbols 510, 514, 512, 520, 530 are opaque, or partially opaque. In another embodiment, the background 540 of the enter password screen 500 is opaque, or partially opaque, and the displayed symbols 510, 514, 512, 520, 530 are transparent, or partially transparent.

Figure 12:
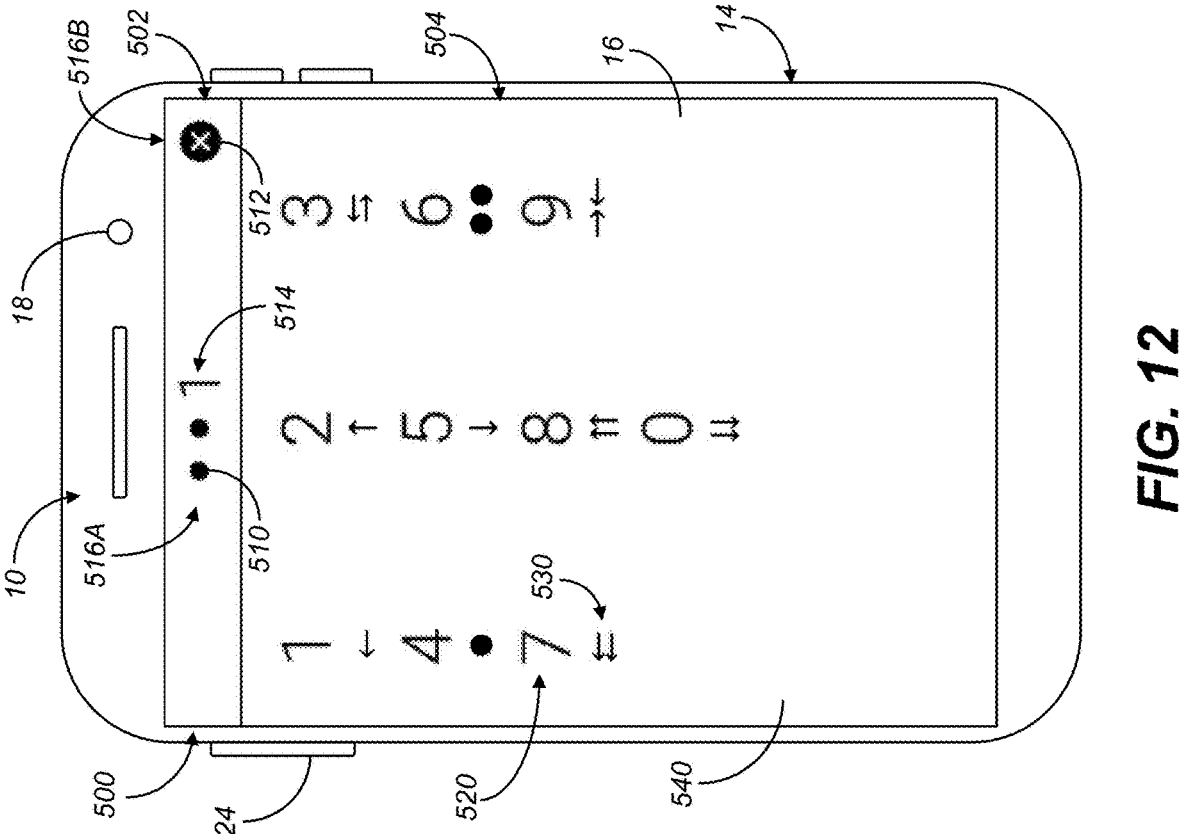
FIG. 12 shows a multi-purpose mobile computing device according to an embodiment of the present disclosure.

As illustrated in FIG. 12, in an embodiment, the electronic device 10 may comprise a multi-purpose mobile computing device such as a smartphone. The multi-purpose mobile computing device 10 includes a gesture input device 16 comprising a touch screen. The multi-purpose mobile computing device 10 also includes a processing unit 14, a camera 18, and a button 24.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. An electronic device, comprising:
a processing unit;
a gesture input device connected with the processing unit, wherein the gesture input device is operable to detect an input gesture to initiate password entry during a software locked state; and
a display;
wherein the processing unit is operable to randomly assign a predefined set of input gestures to a predefined set of password symbols, and wherein the display is operable to show an enter password screen showing the randomly assigned set of input gestures corresponding to the set of password symbols, wherein the display is operable to show the randomly assigned predefined set of input gestures adjacent to the predefined set of password symbols, and wherein the assigned set of input gestures correspond to the set of password symbols until the password entry is reinitiated.

2. The electronic device according to claim 1, further comprising a projector connected with the processing unit, wherein the projector is operable to generate image-bearing light; and a waveguide assembly operable to in-couple the image-bearing light.

3. The electronic device according to claim 2, wherein the display comprises one or more virtual images comprising the image-bearing light.

4. The electronic device according to claim 2, wherein the waveguide assembly comprises one or more planar waveguides.

5. The electronic device according to claim 2, further comprising at least one temple arm.

6. The electronic device according to claim 5, wherein the at least one temple arm comprises a right temple arm and a left temple arm.

7. The electronic device according to claim 5, further comprising a button located on the at least one temple arm, wherein the button is operable to initiate a software unlock process.

8. The electronic device according to claim 5, further comprising a lens or a second waveguide assembly, wherein the gesture input device is a camera located adjacent to the lens or the second waveguide assembly.

9. The electronic device according to claim 5, wherein the gesture input device is located on the at least one temple arm.

10. The electronic device according to claim 9, wherein the gesture input device is a camera.

11. The electronic device according to claim 9, wherein the gesture input device is a touchpad.

12. The electronic device according to claim 1, wherein an enter password screen presented via the display includes a password display region and a gesture map region, wherein the randomly assigned predefined set of input gestures are shown with the set of password symbols in the gesture map region.

13. The electronic device according to claim 12, wherein the gesture input device is configured to detect one of the assigned input gestures, and wherein the display is operable to at least temporarily display an entered password symbol in the password display region corresponding to the detected input gesture; and highlight the detected input gesture in the gesture map region.

14. The electronic device according to claim 1, wherein the gesture input device is a touchpad.

15. The electronic device according to claim 1, wherein the gesture input device is a camera.

16. The electronic device according to claim 1, wherein the gesture input device is a touch screen.

17. The electronic device according to claim 1, wherein the processing unit comprises data storage and program storage.

* * * * *